(12) United States Patent
Nagal

(10) Patent No.: US 12,080,972 B2
(45) Date of Patent: Sep. 3, 2024

(54) SEALING STRUCTURE

(71) Applicant: Tyco Electronics Japan G.K., Kawasaki (JP)

(72) Inventor: Ryuichi Nagal, Kawasaki (JP)

(73) Assignee: Tyco Electronics Japan G.K., Kawasaki (JP)

( * ) Notice: Subject to any disclaimer, the term of this patent is extended or adjusted under 35 U.S.C. 154(b) by 0 days.

(21) Appl. No.: 17/495,019

(22) Filed: Oct. 6, 2021

(65) Prior Publication Data

US 2022/0109265 A1 Apr. 7, 2022

(30) Foreign Application Priority Data

Oct. 6, 2020 (JP) ................................ 2020-169291

(51) Int. Cl.
*H01R 13/52* (2006.01)
*F16J 15/10* (2006.01)

(52) U.S. Cl.
CPC ........ *H01R 13/5202* (2013.01); *F16J 15/104* (2013.01)

(58) Field of Classification Search
CPC ...... F16J 15/104; F16J 15/06; H01R 13/5202; H01R 13/5216; H01R 13/521
See application file for complete search history.

(56) References Cited

U.S. PATENT DOCUMENTS

| | | | |
|---|---|---|---|
| 1,095,810 A * | 5/1914 | Carlitz | F16J 15/104 215/352 |
| 2,451,070 A | 10/1948 | Chamerlain | |
| RE24,478 E * | 5/1958 | Kilbourne, Jr. | F16J 15/128 277/944 |
| 3,150,876 A | 9/1964 | Lafferty | |
| 3,166,332 A | 1/1965 | Olson | |
| 3,511,685 A * | 5/1970 | Rentschler | B32B 27/00 427/322 |
| 3,582,095 A * | 6/1971 | Bogaert | F16J 15/104 428/161 |
| 3,759,285 A * | 9/1973 | Yoakum | E03F 5/02 285/379 |
| 3,787,078 A * | 1/1974 | Williams | E03F 5/02 52/21 |

(Continued)

FOREIGN PATENT DOCUMENTS

| | | |
|---|---|---|
| CN | 209262238 U | 8/2019 |
| CN | 210970025 U | 7/2020 |

(Continued)

OTHER PUBLICATIONS

Extended European Search Report, Application No. 21200625.8-1015, dated: Feb. 22, 2022, 7 pages.

(Continued)

*Primary Examiner* — Eugene G Byrd
(74) *Attorney, Agent, or Firm* — Barley Snyder

(57) ABSTRACT

A seal structure includes a first layer having at least one first upward projecting portion, and a second layer having at least one first upward projecting portion. At least part of the first upward projecting portion of the first layer is covered with the first upward projecting portion of the second layer, and a composition material of the first layer is harder than a composition material of the second layer.

19 Claims, 12 Drawing Sheets

(56) References Cited

U.S. PATENT DOCUMENTS

| | | | | |
|---|---|---|---|---|
| 3,854,736 | A | * | 12/1974 | Farnam .................. F16J 15/104 |
| | | | | 277/633 |
| 4,664,421 | A | * | 5/1987 | Jones .................... F16L 17/025 |
| | | | | 285/345 |
| 5,169,161 | A | * | 12/1992 | Jones .................... F16J 15/025 |
| | | | | 277/615 |
| 5,700,038 | A | * | 12/1997 | Greene .................. F16L 21/02 |
| | | | | 285/345 |
| 6,354,634 | B1 | * | 3/2002 | Dischler ............... F16L 13/142 |
| | | | | 285/331 |
| 6,676,136 | B2 | * | 1/2004 | Miller .................... F16L 5/025 |
| | | | | 277/615 |
| 7,374,210 | B2 | * | 5/2008 | Staskal .................. F16L 5/10 |
| | | | | 285/194 |
| 7,905,498 | B2 | * | 3/2011 | Dempsey ............... F16J 15/122 |
| | | | | 277/654 |
| 8,218,296 | B2 | * | 7/2012 | Rupp .................... H05K 5/061 |
| | | | | 361/679.01 |
| 8,776,351 | B2 | * | 7/2014 | Bird ..................... F16L 21/065 |
| | | | | 285/369 |
| 8,834,761 | B2 | * | 9/2014 | Knapp .................. F16L 21/035 |
| | | | | 264/171.27 |
| 2002/0074741 | A1 | | 6/2002 | Knapp |
| 2003/0107187 | A1 | * | 6/2003 | Yajima .................. F16J 15/104 |
| | | | | 277/628 |
| 2004/0041347 | A1 | | 3/2004 | Beach et al. |
| 2004/0135322 | A1 | * | 7/2004 | Weisbrodt ............. F16J 15/104 |
| | | | | 277/608 |
| 2007/0228668 | A1 | | 10/2007 | Dempsey et al. |
| 2016/0061328 | A1 | * | 3/2016 | Ritoper .................. F16J 15/128 |
| | | | | 277/645 |
| 2019/0011049 | A1 | | 1/2019 | Yanagitake et al. |
| 2019/0128423 | A1 | * | 5/2019 | Yui ....................... F16J 15/102 |
| 2019/0309850 | A1 | * | 10/2019 | Yoshida ................. F16J 15/00 |
| 2022/0136606 | A1 | * | 5/2022 | Morello ............ H01R 13/5202 |
| | | | | 277/370 |

FOREIGN PATENT DOCUMENTS

| | | | | |
|---|---|---|---|---|
| DE | 4240661 | A1 | | 6/1994 |
| JP | 2004311254 | A | | 11/2004 |
| JP | 2010080106 | A | | 4/2010 |
| JP | 5590210 | B1 | | 9/2014 |
| JP | 2015078007 | A | | 4/2015 |
| JP | 2016225057 | A | * | 12/2016 ............ H01R 13/44 |
| JP | 2017098055 | A | | 6/2017 |
| WO | 2019106868 | A1 | | 6/2019 |

OTHER PUBLICATIONS

Examination Report from the European Patent Office dated Apr. 13, 2023, corresponding to Application No. 21200625.8-1015, 5 pages.

Examination Report from the European Patent Office dated Oct. 5, 2023, corresponding to Application No. 21 200 625.8-1015, 5 pages.

Japanese Office Action dated Feb. 19, 2024 with English translation, corresponding to Application No. 2020-169291, 15 pages.

First Chinese Office Action dated May 23, 2024 with English translation, corresponding to Application No. 2024052301661350, 17 pages.

* cited by examiner

A

B

A

B

A

B

A

B

A

B

C

SEALING STRUCTURE

CROSS-REFERENCE TO RELATED APPLICATIONS

This application claims the benefit of Japanese Patent Application No. 2020-169291 filed on Oct. 6, 2020, the whole disclosure of which is incorporated herein by reference.

FIELD OF THE INVENTION

The present disclosure relates to seal structures. More specifically, the present disclosure relates to a seal structure that can be used, for example, in a housing of an electrical connector.

BACKGROUND

Electrical connectors often include seals or sealing structures implemented therein for shielding their internal conductors from the external environment. For example, a conventional seal structure includes a seal formed on a sealed structure such as a housing of a connector by a projecting portion provided on a surface of the seal structure. As indicated by a schematic cross-sectional view in FIG. 13, a conventional seal structure (X) is configured to have at least one projecting portion (Y) (see A of FIG. 13). It should be noted that for convenience of explanation, the projecting portion (Y) of the conventional seal structure is simplistically indicated by a triangular shape. The projecting portion (Y) of the conventional seal structure is formed from an elastic body such as rubber. The projecting portion (Y) is inserted in the direction of an arrow D into a sealed structure (S) such as a housing of a connector to have its apex deformed (see B of FIG. 13). Such a deformation of the apex of the projecting portion (Y) ensures sealability for the sealed structure (S).

As shown in B of FIG. 13, a deformed projecting portion (Y') presses the sealed structure (S), for example, by a force F0, but due to an abnormal deformation of the projecting portion (Y), the force (F0) by which the sealed structure (S) is pressed may decrease. Specifically, there may be a decrease in sealability. As shown in C of FIG. 13, while the projecting portion (Y) has an overall height (h0) before a deformation, there is a decrease in height of the apex by a height (h1) after the deformation. Due to an abnormal deformation of the projecting portion (Y), the height of the apex may decrease by 50% or more (that is, the value of h1/h0 may become greater than or equal to ½). Therefore, in the conventional seal structure (X), the force (F0) by which the projecting portion (Y') presses the sealed structure (S) decreases due to such an abnormal deformation (see B of FIG. 13). This leads by extension to a decrease in sealability of the structure.

Further, as shown in C of FIG. 13, while the projecting portion (Y) has an overall width (w0) before a deformation, the deformation of the projecting portion (Y) causes the apex of the projecting portion (Y) to be displaced by a width (w1) after the deformation. Due to an abnormal deformation of the projecting portion (Y), the apex may be displaced in a width direction by 50% or more. (i.e., the value of w1/w0 may become greater than or equal to ½). Therefore, it is necessary to provide a spacing between a projecting portion and a projecting portion in the conventional seal structure (X). As a result of this required spacing, a reduction in the overall width of the seal structure (X) (i.e., to reduce the size of the seal structure in a width direction) is more difficult to achieve.

Accordingly, there is a need for connector seal structures having improved sealability as well as reduced size compared to structures of the prior art.

SUMMARY

According to an embodiment of the present disclosure, a seal structure includes a first layer having at least one first upward projecting portion, and a second layer having at least one first upward projecting portion. At least part of the first upward projecting portion of the first layer is covered with the first upward projecting portion of the second layer, and a composition material of the first layer is harder than a composition material of the second layer.

BRIEF DESCRIPTION OF THE DRAWINGS

The invention will now be described by way of example with reference to the accompanying Figures, of which.

DETAILED DESCRIPTION OF THE EMBODIMENTS

Figure 1:
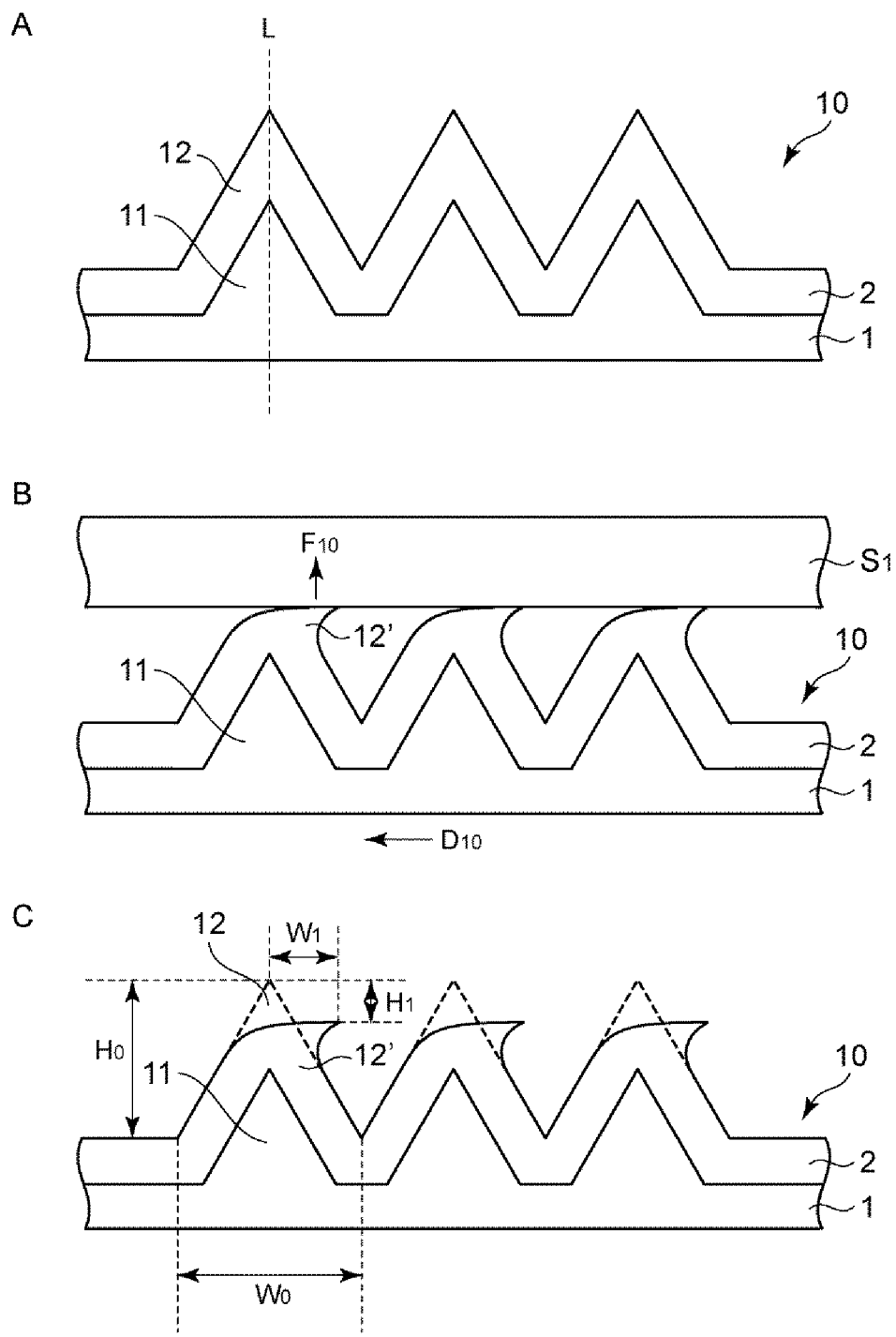
FIG. 1 is a schematic view schematically showing a seal structure according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein;

rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As shown in FIG. 1, the present disclosure provides a seal structure (10) including at least a first layer (1) and a second layer (2). The first layer (1) has at least one first upward projecting portion (11), and the second layer (2) has at least one first upward projecting portion (12). At least part of the first upward projecting portion (11) of the first layer (1) is covered with the first upward projecting portion (12) of the second layer (2). A composition material of the first layer (1) is harder than a composition material of the second layer (2). The seal structure of the present disclosure may further include a third layer (3) (see FIG. 8). However, the numbers of projecting portions and layers that may be included in the seal structure of the present disclosure are not limited to any particular numbers. The seal structure according to embodiments of the present disclosure may have a shape such as a ring shape, a tube shape, or a porous shape as its overall shape, as shown in FIG. 9.

In the present disclosure, the term "seal structure" means a component or a member that may form a seal or sealing in combination with a given "sealed structure" that will be described in detail below. In the present disclosure, the term "sealed structure" means a component or a member that requires a seal. It is preferable that the sealed structure have such a structure that the seal structure of the present disclosure can be inserted into the sealed structure. In particular, it is preferable that the sealed structure have such a structure that the seal structure forms a seal by making contact with an inner wall of the sealed structure. An example of the sealed structure is a housing of a connector, a body, a plug, a cord, or an electric wire of a connector that can engage or mate with a housing of the connector, or a fixture thereof. However, that the sealed structure is not limited to these examples. For example, in a case where the sealed structure is a structure such as a housing of a connector, the seal structure of the present disclosure makes contact with and engages and/or mate with the sealed structure so that the seal structure of the present disclosure and the sealed structure engage or bind with each other.

In the present disclosure, the term "seal" means the prevention or inhibition of entry of gas such as moisture and water vapor and/or dust into the space between the seal structure of the present disclosure and the sealed structure.

[First Layer]

The first layer has a laminar structure, and has at least one first upward projecting portion. The first upward projecting portion may be included in the first layer means a portion raised from a surface of the first layer (and is hereinafter sometimes abbreviated as "upward projecting portion" or simply as "projecting portion"). The number of projecting portions that may be provided in the first layer is not limited to any particular number. For example, one to ten projecting portions may be provided in the first layer. Preferably, one to five projecting portions may be provided in the first layer. More preferably, one to three projecting portions may be provided in the first layer. The projecting portion may for example be a projection raised from the surface of the first layer to continuously extend.

In the present disclosure, for convenience of explanation, the word "upward" of the "upward projecting portion" of the "first layer" means a side on which the "second layer", which will be described in detail below, is disposed. In other words, the side on which the "second layer" is disposed is referred to as pointing "upward".

The shape of the projecting portion that may be provided in the first layer is not limited to any particular shape. It is preferable that the projecting portion have a triangular shape or a rectangular shape (including a trapezoid) such as a quadrangle in cross-section. The projecting portion may have a rounded edge portion. Alternatively, the projecting portion may have a circular arc apex.

The composition material that may constitute the first layer (hereinafter sometimes referred to as "composition material of the first layer") is harder than the composition material that may constitute the second layer, which will be described in detail later (hereinafter sometimes referred to as "composition material of the second layer"). In other words, the composition material of the second layer has such flexibility as to more easily deform than the composition material of the first layer in response to external force. That is, the composition material of the first layer has such flexibility as to more hardly deform than the composition material of the second layer.

In the present disclosure, the term "composition material" of a layer means one or more materials that may form the layer. It is preferable that the composition material of the first layer contain resin. Any resin can be used in the first layer. For example, it is preferable that rubber such as polybutadiene or silicone be used. Further, resin that can be used in the first layer may be selected depending on temperature.

In the present disclosure, resin primarily contained in the composition material of the first layer is referred to as "first resin".

The hardness of the composition material of the first layer is higher than the hardness of the composition material of the second layer, and is not limited to any particular range.

Examples of the hardness of the composition material of the first layer include Shore hardness, Rockwell hardness, Vickers hardness, Brinell hardness, durometer hardness, and Barcol hardness. The hardness of the composition material of the first layer is not limited to any particular value, and any of the above hardnesses falls within a range of for example 20 to 50, preferably 25 to 45, or more preferably 30 to 40. It is preferable that Shore hardness fall within the above range. In a case where the composition material of the first layer is for example resin, the hardness of the composition material of the first layer can be changed by a filler, a hardening agent, or other substances that are used in manufacturing the resin.

The first layer may further include, on an as-needed basis, at least one "second upward projecting portion" or "third upward projecting portion" or other portions that are different in shape from the "first upward projecting portion" provided in the first layer. In the present disclosure, the number of projecting portions that may be provided in the first layer is not limited to any particular number.

[Second Layer]

The second layer has a laminar structure, and has at least one first upward projecting portion. The "first upward projecting portion" that may be included in the second layer means a portion raised from a surface of the second layer (and is hereinafter sometimes abbreviated as "upward projecting portion" or simply as "projecting portion"). The number of projecting portions that may be provided in the second layer is not limited to any particular number. For example, one to ten projecting portions may be provided. Preferably, one to five projecting portions may be provided. More preferably, one to three projecting portions may be provided. The projecting portion may for example be a projection raised from the surface of the second layer to continuously extend.

In the present disclosure, for convenience of explanation, the word "upward" of the "upward projecting portion" of the "second layer" means a direction opposite to the "first layer".

The shape of the projecting portion that may be provided in the second layer is not limited to any particular shape. It is preferable that the outer shape, in particular, of the projecting portion be a triangular shape or a rectangular shape (including a trapezoid) such as a quadrangle in cross-section. The projecting portion may have a rounded edge portion. Alternatively, the projecting portion may have a circular arc apex. It is preferable that the apex of the projecting portion of the second layer be more rounded than the apex of the projecting portion of the first layer.

The projecting portion that may be provided in the second layer may extend, for example, so as to meander in a cross-sectional view of the seal structure (see A of FIG. 1).

It is preferable that the composition material that may constitute the second layer (hereinafter sometimes referred to as "composition material of the second layer") be softer than the composition material of the first layer. It is more preferable that the composition material of the second layer contain resin. Any resin can be used in the second layer. For example, it is preferable that rubber such as polybutadiene or silicone be used. Further, resin that can be used in the second layer may be selected depending on temperature.

In the present disclosure, resin primarily contained in the composition material of the second layer is referred to as "second resin".

The hardness of the composition material of the second layer is lower than the hardness of the composition material of the first layer, and is not limited to any particular range.

Examples of the hardness of the composition material of the second layer include Shore hardness, Rockwell hardness, Vickers hardness, Brinell hardness, durometer hardness, and Barcol hardness. The hardness of the composition material of the second layer is not limited to any particular value, and any of the above hardnesses falls within a range of for example 20 to 50, preferably 25 to 45, or more preferably 30 to 40. It is preferable that Shore hardness fall within the above range. In a case where the composition material of the second layer is for example resin, the hardness of the composition material of the second layer can be changed by a filler, a hardening agent, or other substances that are used in manufacturing the resin.

The second layer may further include, on an as-needed basis, at least one "second upward projecting portion" or "third upward projecting portion" or other portions that are different in shape from the "first upward projecting portion" provided in the second layer. The number of projecting portions that may be provided in the second layer is not limited to any particular number.

[Features of Seal Structure of the Present Disclosure]

A seal structure of the present disclosure includes at least a first layer and a second layer, and at least part of a first upward projecting portion of the first layer is covered with a first upward projecting portion of the second layer (see, for example, the first upward projecting portion (11) of the first layer (1) and the first upward projecting portion (12) of the second layer (2) shown in FIG. 1). A composition material of the first layer is harder than a composition material of the second layer. The seal structure of the present disclosure can be entered or inserted into a sealed structure such as a housing of a connector. With the aforementioned configuration of two projecting portions, the seal structure of the present disclosure can press the sealed structure from within with further improved force (see B of FIG. 1). For such a reason, the seal structure of the present disclosure can provide further improved sealability. Further, with such a configuration of two projecting portions, the seal structure of the present disclosure can inhibit an abnormal deformation of a projecting portion.

For example, as shown in A of FIG. 1, a seal structure 10 according to an embodiment of the present disclosure includes a first layer (i.e. a layer denoted by reference numeral "1") and a second layer (i.e. a layer denoted by reference numeral "2").

The first layer (1) includes at least one first upward projecting portion 11 (hereinafter abbreviated as "projecting portion 11" or simply as "projecting portion"). The second layer (2) includes at least one first upward projecting portion 12 (hereinafter abbreviated as "projecting portion 12" or simply as "projecting portion"), too. In the illustrated embodiment, for convenience of explanation, the first layer (1) has three projecting portions of the same shape, and the second layer (2) similarly has three projecting portions 12 of the same shape. In the present disclosure, the projecting portions may be identical or different in shape and dimension to or from one another. The projecting portions may be continuously disposed or separately disposed.

In the illustrated embodiment, the whole of a surface of a projecting portion 11 of the first layer (1) is covered with a projecting portion 12 of the second layer (2). In the seal structure 10, at least part of the surface of the projecting portion 11 of the first layer (1) needs only be covered with the projecting portion 12 of the second layer (2). Any part of the projecting portion 11 of the first layer (1) may be covered with the projecting portion 12 of the second layer (2). It is preferable that an apex of the projecting portion 11 of the first layer (1) be covered with the projecting portion 12 of the second layer (2). Further, the part of the projecting portion 11 of the first layer (1) that is covered with the projecting portion 12 of the second layer (2) may be determined for each projecting portion of the first layer (1). In other words, the part of the projecting portion 11 of the first layer (1) that is covered with the projecting portion 12 of the second layer (2) may vary from one projecting portion to another.

Although, in the illustrated embodiment, the first layer (1) and the second layer (2) have substantially the same outer shape, the seal structure of the present disclosure is not limited to one having such a shape. In the first layer (1) and the second layer (2), projecting portions of various shapes and dimensions can be independently selected for use.

In the illustrated embodiment, the outer shapes of the projecting portion 11 of the first layer (1) and the projecting portion 12 of the second layer (2) are both triangular in cross-section. In the seal structure of the present disclosure, the shapes of the projecting portions are not limited to such shapes.

The cross-sectional shape of a projecting portion of the first layer (1) and the cross-sectional shape of a projecting portion of the second layer (2) are not limited to any particular combination. Geometric cross-sectional shapes can be each independently selected as appropriate for use in a projecting portion of the first layer (1) and a projecting portion of the second layer (2).

Although, in the illustrated embodiment, the apex of the projecting portion 11 of the first layer (1) and the apex of the projecting portion 12 of the second layer (2) are aligned on a straight line L, the apices do not need to be aligned on the straight line L. In other words, the position of the apex of the projecting portion 11 of the first layer (1) and/or the position of the apex of the projecting portion 12 of the second layer (2) may be off the straight line L. That is, the apex of the projecting portion 11 of the first layer (1) and/or the apex of the projecting portion 12 of the second layer (2) may or may not be present on the straight line L.

In the seal structure 10, the composition material of the first layer (1) is harder than the composition material of the second layer (2). In other words, the composition material of the second layer (2) is softer than the composition material of the first layer (1).

Specifically, it is preferable that the composition material that may constitute the projecting portion 11 of the first layer (1) be harder than the composition material that may constitute the projecting portion 12 of the second layer (2). In other words, it is preferable that the composition material that may constitute the projecting portion 12 of the second layer (2) be softer than the composition material that may constitute the projecting portion 11 of the first layer (1).

In the seal structure of the present disclosure, it is preferable that the composition materials that may constitute the first layer and the second layer both contain resin and the resin primarily contained in the first layer (i.e. the "first resin") be harder than the resin primarily contained in the second layer (i.e. the "second resin") or the second resin be softer than the first resin. In the present disclosure, any resin is used, provided a difference in hardness can be provided between the first resin and the second resin. In the first layer and the second layer, identical types of resin differing in hardness from each other may be used. Alternatively, in the first layer and the second layer, different types of resin differing in hardness from each other may be used.

More specifically, in the case of any of the above hardnesses, the difference between the hardness of the material that may constitute the first layer, specifically the first resin, and the hardness of the material that may constitute the second layer, specifically the second resin, fall within a range of preferably 5 to 25 or more preferably 10 to 20. By thus providing a difference in hardness between the first resin and the second resin in the seal structure of the present disclosure, further improvement in sealability can be brought about.

It is preferable that the projecting portion of the second layer have "flexibility". In the present disclosure, the term "flexibility" means the property of deforming in response to external force. It is preferable that the projecting portion of the second layer elastically deform.

For example, it is preferable that as shown in A and B of FIG. 1, the projecting portion 12 of the second layer (2) elastically deform upon contact with the sealed structure (S1). More specifically, it is preferable that the position of the apex of the projecting portion of the second layer (2) be elastically displaced (see a deformed projecting portion 12' shown in B of FIG. 1).

For example, as shown in C of FIG. 1, it is preferable that the height of the projecting portion 12 of the second layer (2), specifically the position of its apex, vary or decreases within a range of, for example, less than 50%, for example, in a height direction with respect to the overall height (H0) of the projecting portion 12. More preferably, the position of its apex can vary within a range of 40% or less (see C of FIG. 1). Even more preferably, the position of its apex can vary within a range of 20% to 30%.

More specifically, as shown in C of FIG. 1, the position of the apex of the projecting portion 12 can be displaced by H1 in a height direction with respect to the overall height H0 (see the deformed projecting portion 12'). In this case, it is preferable that the value of H1/H0 be less than ½. More preferably, the value of H1/H0 is less than or equal to ⅖, or even more preferably, the value of H1/H0 is greater than or equal to ⅕ and less than or equal to 3/10.

It should be noted that the height H0 of the projecting portion of the second layer (2) may vary from one projecting portion to another. Further, similarly, the overall height of the projecting portion of the first layer (1) may vary from one projecting portion to another. It is preferable that the overall height (H0) of the projecting portion of the second layer (2) be greater than the overall height of the projecting portion of the first layer (1).

By thus limiting the displacement of the projecting portion 12 of the second layer (2) in a height direction to less than 50%, the force (F10) with which the deformed projecting portion 12' presses the sealed structure (S1) can be further increased (see B of FIG. 1). Moreover, an abnormal deformation of the projecting portion 12 can be inhibited. In particular, further improvement in sealability can be brought about. Such effects are attributed to the presence of the projecting portion 11 of the first layer (1), which is harder than the second layer (2), below the projecting portion 12 of the second layer (2).

Further, the presence of the projecting portion 11 of the first layer (1), which is harder than the second layer (2), below the projecting portion 12 of the second layer (2) makes it possible to reduce the overall thickness dimension of the seal structure 10. Moreover, the size of the seal structure 10 can be reduced in a thickness direction. Such a reduction in size may contribute to a reduction in size of the sealed structure, specifically a housing of a connector or other structures.

Furthermore, it is preferable that the projecting portion 12 of the second layer (2), specifically its apex, vary within a range of less than 50% in a width direction with respect to the overall width (W0) of the projecting portion 12. More preferably, the apex can vary within a range of 40% or less. Even more preferably, the apex can vary within a range of 20% to 30%.

More specifically, as shown in C of FIG. 1, the position of the apex of the projecting portion 12 of the second layer (2) can be displaced by W1 in a width direction with respect to the overall width W0 (see the deformed projecting portion 12'). In this case, it is preferable that the value of W1/W0 be less than ½. More preferably, the value of W1/W0 is less than or equal to ⅖, or even more preferably, the value of W1/W0 is greater than or equal to ⅕ and less than or equal to 3/10.

It should be noted that the overall width W0 of the projecting portion of the second layer (2) may vary from one projecting portion to another. Further, similarly, the overall width of the projecting portion of the first layer (1) may vary from one projecting portion to another.

By thus limiting the displacement of the projecting portion 12 of the second layer (2) in a width direction to less than 50% makes it possible to further reduce the dimension of the projecting portion 12 in a width direction and the spacing between projecting portions 12. Moreover, the dimension of the seal structure 10 in a width direction can be further reduced. Moreover, the overall size of the seal structure 10 can be reduced in a width direction. Such a reduction in size may contribute to a reduction in size of the sealed structure, specifically a housing of a connector or other structures.

In the present disclosure, the term "width direction" means, for example, the direction of the overall width W0 in C of FIG. 1 or a horizontal direction on the surface of paper. Further, in a case where the sealed structure is a housing of a connector or other structures, the "width direction" of the seal structure may mean the direction of mating of the seal structure of the present disclosure with the sealed structure.

Although, in the illustrated embodiment, a lower surface of the first layer (1) (i.e. a surface of the first layer (1) opposite to the surface of the first layer (1) facing the second layer (2)) is flat, the shape of the lower surface of the first layer (1) can be changed as appropriate in conformance with the shape of a surface of another sealed structure (hereinafter sometimes referred to as "second sealed structure") that may make direct contact with the lower surface of the first layer (1) (see FIG. 7). That is, the lower surface of the first layer (1) is not limited to a flat shape.

The shape of the apex of the projecting portion 11 of the first layer (1) and/or the shape of the apex of the projecting portion 12 of the second layer (2) may be changed as appropriate in conformance with the shape of a surface of the sealed structure S1 (see B of FIG. 1). That is, the shape of the apex of the projecting portion 11 of the first layer (1) and/or the shape of the apex of the projecting portion 12 of the second layer (2) is/are not limited to a shape having a sharp edge portion.

By the outer shapes of projecting portions (11, 12) of the seal structure 10 being triangular in cross-section, entry or insertion into the sealed structure S1 (i.e. entry or insertion along the direction of an arrow D10) may be further promoted (see B of FIG. 1).

The triangular cross-sectional shape of a projecting portion shown in FIG. 1 may be bilaterally asymmetrical. In other words, it may or may not be symmetrical with respect to a perpendicular passing through the apex of the projecting portion.

Figure 2:
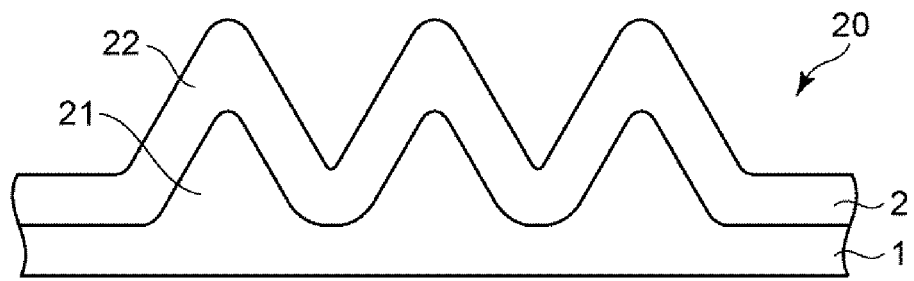
FIG. 2 is a schematic view schematically showing a variation of the seal structure according to the embodiment of the present disclosure.

As a variation, for example, as shown in FIG. 2, the apices of projecting portions (21, 22) of a seal structure 20 may have rounded edge portions. In other words, the projecting portions (21, 22) may be "substantially triangular" in cross-section.

For example, by the projecting portions (21, 22) of the seal structure 20, particularly the projecting portion 22 provided in the second layer (2), having rounded apices as shown in FIG. 2, entry or insertion into a sealed structure can be promoted and the force by which the sealed structure is pressed can be further increased. In the seal structure 20, only the projecting portion 22 of the second layer (2) may be rounded. In other words, the projecting portion 21 of the first layer (1) may have a sharp edge portion.

The triangular cross-sectional shape of a projecting portion shown in FIG. 2 may be bilaterally asymmetrical. In other words, it may or may not be symmetrical with respect to a perpendicular passing through the apex of the projecting portion.

Figure 3:
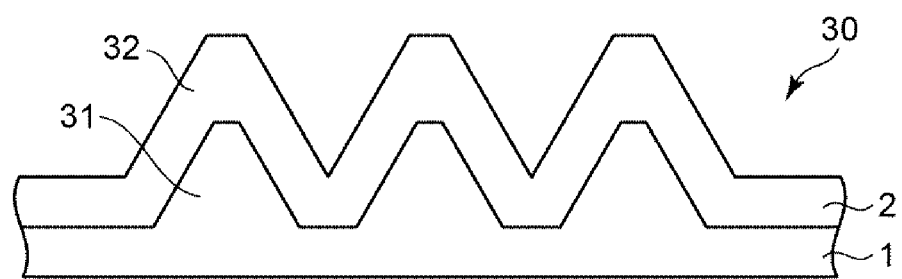
FIG. 3 is a schematic view schematically showing a variation of the seal structure according to the embodiment of the present disclosure.
Figure 3:
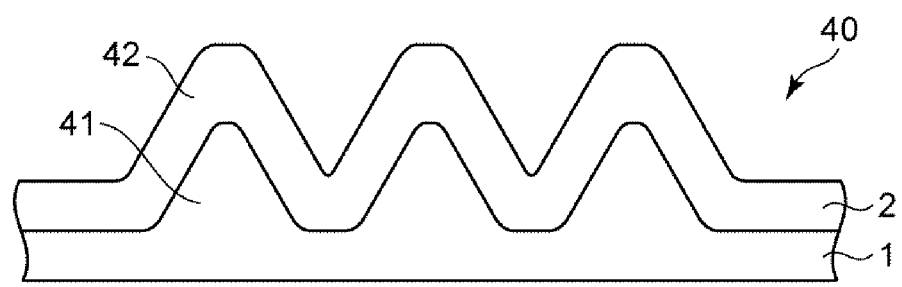

As another variation, for example, A of FIG. 3 shows a seal structure 30 having projecting portions (31, 32) having shapes formed by flattening the apices of triangles or trapezoidal shapes. Since the projecting portions (31, 32) shown in A of FIG. 3 have flat apices, the force by which a sealed structure is pressed can be further increased.

As another variation, for example, B of FIG. 3 shows a seal structure 40 having projecting portions (41, 42) having trapezoidal shapes formed by rounding the edge portions shown in A of FIG. 3 (such shapes being hereinafter referred to as "substantially trapezoidal shapes"). By the projecting portions (41, 42) having substantially trapezoidal shapes, entry or insertion into a sealed structure can be promoted and the force by which the sealed structure is pressed can be further increased. In the seal structure 40, only the projecting portion 42 of the second layer (2) may be rounded. In other words, the projecting portion 41 of the first layer (1) may have a sharp edge portion.

The triangular cross-sectional shape of a projecting portion shown in A or B FIG. 3 may be bilaterally asymmetrical. In other words, it may or may not be symmetrical with respect to a perpendicular passing through the apex of the projecting portion.

Figure 4:
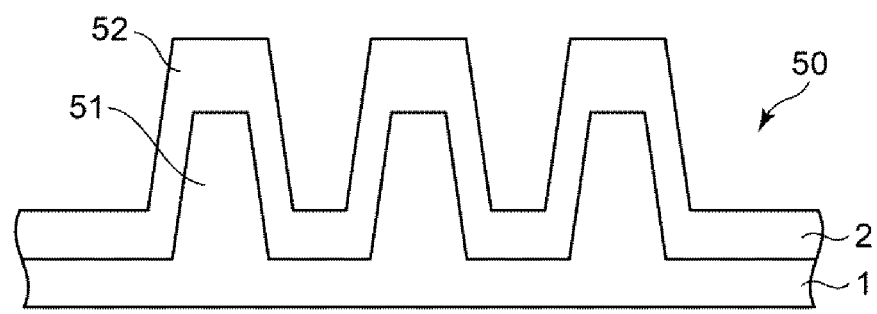
FIG. 4 is a schematic view schematically showing a variation of the seal structure according to the embodiment of the present disclosure.
Figure 4:
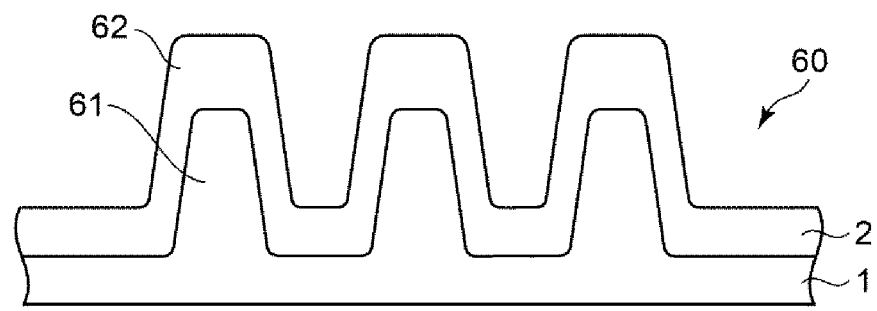

As another variation, for example, A of FIG. 4 shows a seal structure 50 having projecting portions (51, 52) having more upright trapezoidal shapes (hereinafter referred to as "substantially quadrangular shapes"). It is preferable that each of the projecting portions (51, 52) have an angle of inclination larger than or equal to 80 degrees and smaller than or equal to 90 degrees. By the projecting portions (51, 52) having substantially quadrangular shapes, the force by which a sealed structure is pressed can be further increased.

As another variation, for example, B of FIG. 4 shows a seal structure 60 having projecting portions (61, 62) having substantially quadrangular shapes formed by rounding the edge portions shown in A of FIG. 3. By such projecting portions (61, 62), entry or insertion of the seal structure 60 into a sealed structure can be promoted and the force by which the sealed structure is pressed can be further increased. In the seal structure 60, only the projecting portion 62 of the second layer (2) may be rounded. In other words, the projecting portion 61 of the first layer (1) may have a sharp edge portion.

As another variation, for example, for further promotion of entry of a seal structure into a sealed structure and a further increase in the force by which the sealed structure is pressed, the shapes of projecting portions of the seal structure may be right triangles.

Figure 5:
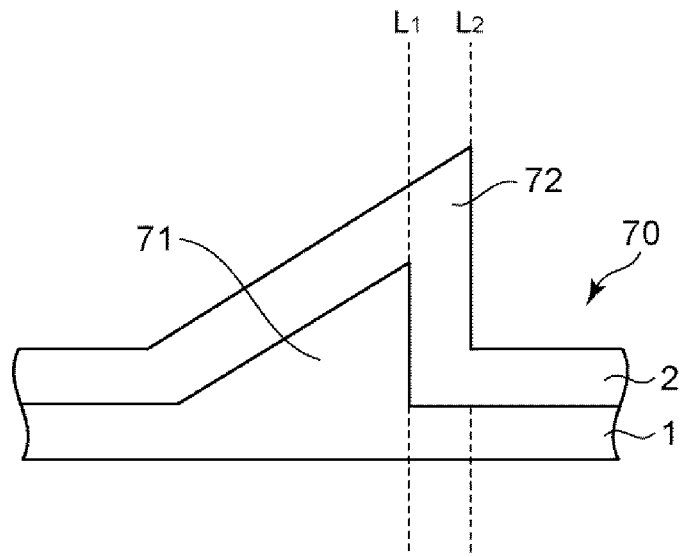
FIG. 5 is a schematic view schematically showing a variation of the seal structure according to the embodiment of the present disclosure.
Figure 5:
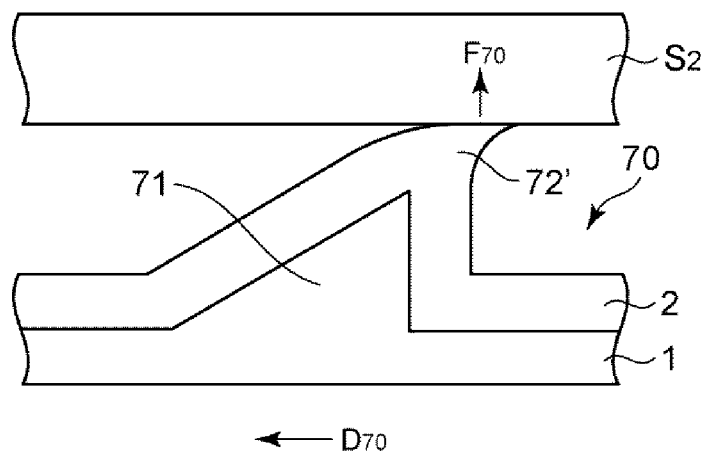

A seal structure 70 shown, for example, in A of FIG. 5 has first upward projecting portions (71, 72) whose outer shapes are right triangular in cross-section.

As shown in B of FIG. 5, the seal structure 70 can enter into a sealed structure S2 along the direction of an arrow D70. The projecting portion 72 of the second layer (2), which is disposed above the projecting portion 71 of the first layer (1), can deform upon contact with an inner wall of the sealed structure S2 (see a deformed projecting portion 72').

Since the projecting portion 72 of the second layer (2) may be supported by the projecting portion 71 of the first layer (1), the deformed projecting portion 72' makes it possible to press the sealed structure S2 with a further greater force (F70) (see B of FIG. 5).

For example, as shown in A of FIG. 5, the shapes of the projecting portions (71, 72) of the seal structure 70, particularly the outer shape of the projecting portion 72 in cross-section, are right triangles. Therefore, for example, as shown in B of FIG. 5, the entry of the seal structure 70 into the sealed structure S2 along the direction of the arrow D70 can be promoted, and the sealed structure S2 can be pressed with a further greater force (F70).

For example, as shown in A of FIG. 5, it is preferable that the projecting portions (71, 72) of the seal structure 70 have slopes in the direction of movement of the seal structure 70

(i.e. the direction of the arrow D70 shown in B of FIG. 5). Doing so makes it possible to further promote the entry of the seal structure 70 into the sealed structure S2 and further increase the force by which the sealed structure S2 is pressed.

For example, as shown in A of FIG. 5, the apex of the projecting portion 71 of the first layer (1) is on a straight line L1. The apex of the projecting portion 72 of the second layer (2) is on a straight line L2. Thus, in the embodiment shown in A of FIG. 5, there may be a position gap between the apex of the projecting portion 71 and the apex of the projecting portion 72. In other words, the apex of the projecting portion 71 and the apex of the projecting portion 72 may be present or may not be present in the same straight line. The difference in position between the apices makes it possible to further promote the entry of the seal structure 70 into the sealed structure S2 and further increase the force by which the sealed structure S2 is pressed (see B of FIG. 5).

The projecting portions (71, 72) of the seal structure 70 shown, for example, in A of FIG. 5 may have rounded apices (not illustrated). Dosing so makes it possible to further promote the entry of the seal structure 70 into the sealed structure S2. In the seal structure 70, only the projecting portion 72 of the second layer (2) may be rounded. In other words, the projecting portion 71 of the first layer (1) may have a sharp edge portion.

As mentioned above, the seal structure of the present disclosure can have projecting portions of various shapes. Projecting portions of such various shapes may be combined as needed for use. The present disclosure is not limited to any particular combination of shapes of projecting portions.

In addition to the first upward projecting portion, the first layer (1) may further have, for example, at least one second upward projecting portion of a different shape. Furthermore, in addition to the first upward projecting portion, the second layer (2) may further have, for example, at least one second upward projecting portion of a different shape. In such an aspect, it is preferable that at least part of the second upward projecting portion of the first layer (1) be covered with the second upward projecting portion of the second layer (2). Having such a configuration makes it possible to bring about further improvement in sealability.

Furthermore, in addition to the first upward projecting portion and the second upward projecting portion, the first layer (1) may further have, for example, a third upward projecting portion of a different shape. In addition to the first upward projecting portion and the second upward projecting portion, the second layer (2) may further have, for example, a third upward projecting portion of a different shape. In such an aspect, it is preferable that at least part of the third upward projecting portion of the first layer (1) be covered with the third upward projecting portion of the second layer (2). Having such a configuration makes it possible to bring about further improvement in sealability.

A composition material of the first upward projecting portion of the first layer (1) may be different in hardness from a composition material of the second upward projecting portion and/or the third upward projecting portion of the first layer (1). Having such a configuration makes it possible to support the second layer (2) more appropriately. Moreover, a more appropriate seal can be provided.

A composition material of the first upward projecting portion of the second layer (2) may be different in hardness from a composition material of the second upward projecting portion and/or the third upward projecting portion of the second layer (2). Having such a configuration makes it possible to provide a more appropriate seal.

Figure 6:
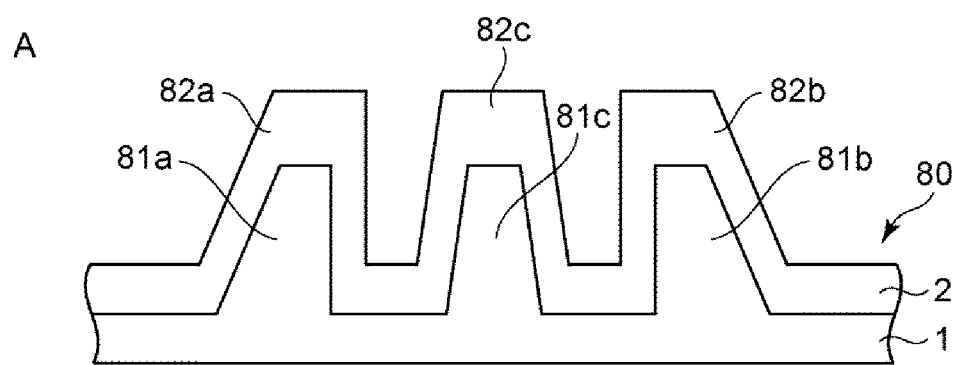
FIG. 6 is a schematic view schematically showing a variation of the seal structure according to the embodiment of the present disclosure.
Figure 6:
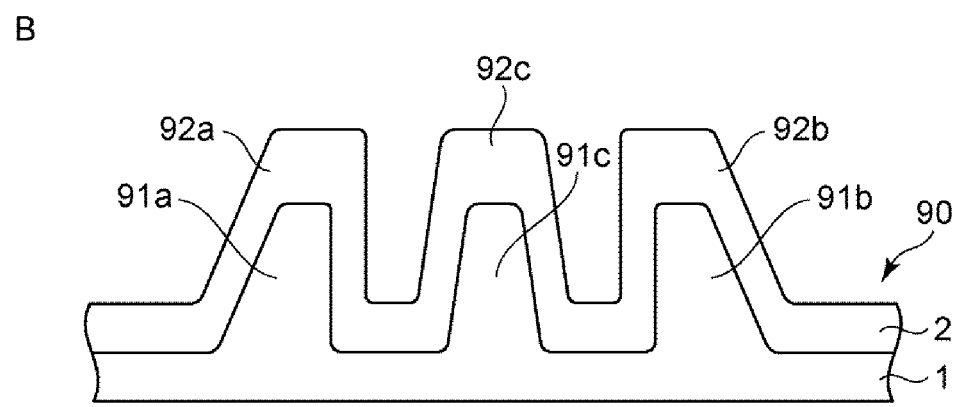

For example, in a seal structure shown in A of FIG. 6, the first layer (1) has three upward projecting portions (81a, 81b, 81c), and the second layer (2) disposed above the first layer (1) has three upward projecting portions (82a, 82b, 82c), too In the first layer (1), for convenience of explanation, the projecting portion 81a is referred to as "first upward projecting portion", the projecting portion 81b as "second upward projecting portion", and the projecting portion 81c as "third upward projecting portion". They are hereinafter sometimes abbreviated as "projecting portion 81a", "projecting portion 81b", and "projecting portion 81c".

In the second layer (2), for convenience of explanation, the projecting portion 82a is referred to as "first upward projecting portion", the projecting portion 82b as "second upward projecting portion", and the projecting portion 82c as "third upward projecting portion". They are hereinafter sometimes abbreviated as "projecting portion 82a", "projecting portion 82b", and "projecting portion 82c".

In the first layer (1) shown in A of FIG. 6, the projecting portion 81a and the projecting portion 81b have, as their cross-sectional shapes, shapes formed by flattening the apices of right triangles or substantially trapezoidal shapes. The projecting portion 81c is substantially quadrangular in cross-section.

In the second layer (2) shown in A of FIG. 6, the outer shapes of the projecting portion 82a and the projecting portion 82b have, as their cross-sectional shapes, shapes formed by flattening the apices of right triangles or substantially trapezoidal shapes. The outer shape of the projecting portion 82c is substantially quadrangular in cross-section.

The seal structure 80 illustrated in A of FIG. 6 can enter into a sealed structure from either the projecting portion 82a or the projecting portion 82b of the second layer (2) (not illustrated).

Such a structure can be utilized in a seal structure 200 having a ring-type overall shape shown, for example, in A of FIG. 9. In a case where the ring-type seal structure 200 shown, for example, in A of FIG. 9 is inserted into a sealed structure (or a first sealed structure) such as a housing of a connector, it is not necessary to select a direction of insertion of the seal structure.

Such projecting portions of the seal structure 80 shown, for example, in A of FIG. 6 make it possible to further promote the entry of the seal structure 80 into the sealed structure and further increase the force by which the sealed structure is pressed.

The first layer (1) and the second layer (2) shown in A of FIG. 6 may be substantially the same in outer shape. The shapes of the first layer (1) and the second layer (2), particularly the shapes of the projecting portions, may be different from each other. In the first layer (1) and the second layer (2), projecting portions of various shapes can be each independently selected.

As a further variation, for example, B of FIG. 6 shows a seal structure 90 whose projecting portions have rounded edge portions. Since the projecting portions of the seal structure 90 have rounded edge portions, entry of the seal structure 90 into a sealed structure can be further promoted. Further, the apex of the projecting portions, particularly, the projecting portions (92a, 92b, 92c) of the second layer (2), may have circular arc apices.

Figure 7:
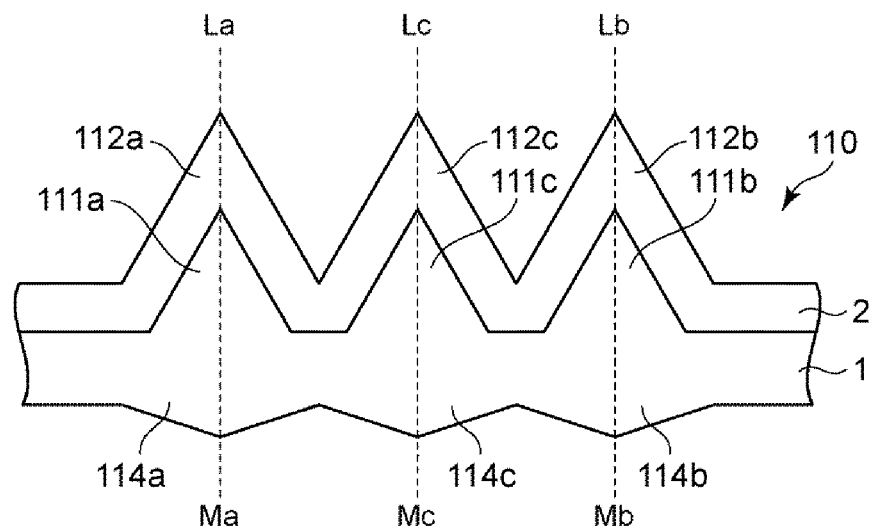
FIG. 7 is a schematic view schematically showing a variation of the seal structure according to the embodiment of the present disclosure.
Figure 7:
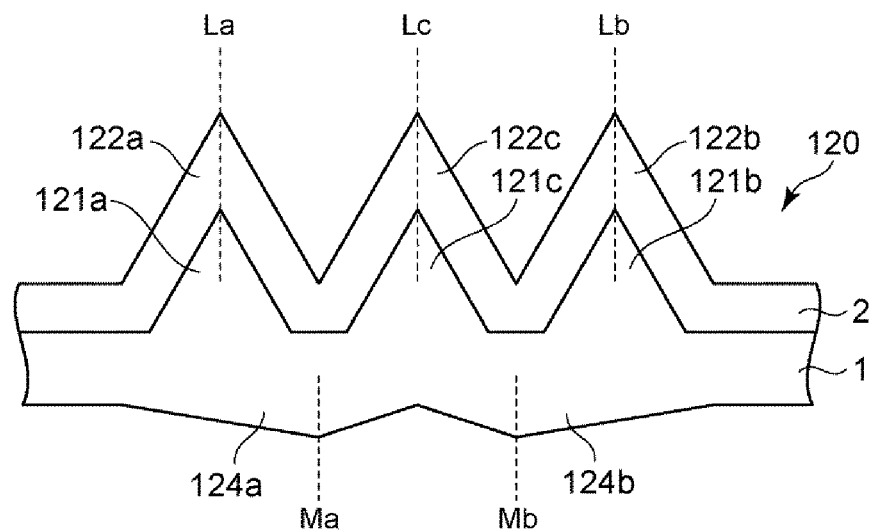

A seal structure according to another embodiment of the present disclosure is shown in FIG. 7. In a seal structure 110 shown, for example, in A of FIG. 7, the first layer (1) has first upward projecting portions 111, specifically three upward projecting portions 111a, 111b, and 111c. They are hereinafter sometimes abbreviated as "projecting portions 111a, 111b, and 111c" or simply as "upward projecting portions" or "projecting portions".

The second layer (2) has first upward projecting portions 112, specifically three upward projecting portions 112a, 112b, and 112c. They are hereinafter sometimes abbreviated as "projecting portions 112a, 112b, and 112c" or simply as "upward projecting portions" or "projecting portions".

The projecting portions (111, 112) shown in A of FIG. 7 are similar to the projecting portions (11, 12) shown in FIG. 1. Further, the projecting portions (111, 112) shown in A of FIG. 7 may be replaced as needed by the projecting portions illustrated in any of FIGS. 2 to 6.

The seal structure 110 illustrated in A of FIG. 7 may have three downward projecting portions 114, more specifically three downward projecting portions 114a, 114b, and 114c, on the lower surface of the first layer (1) (or the surface of the first layer (1) facing in a direction opposite to the direction of projection of the projecting portion 111 or the surface of the first layer (1) opposite to the surface of the first layer (1) facing the second layer (2)). They are hereinafter sometimes abbreviated as "projecting portions 114a, 114b, and 114c" or simply as "downward projecting portions" or "projecting portions".

The number of projecting portions that may be provided on the lower surface of the first layer (1) is not limited to any particular number. For example, one to ten projecting portions may be provided. Preferably, one to five projecting portions may be provided. More preferably, one to three projecting portions may be provided. The projecting portions may for example be projections raised from the lower surface of the first layer to continuously extend.

It is preferable that the projecting portions (114a, 114b, 114c) that can be provided on the lower surface of the first layer (1) of the seal structure 110 be formed in conformance with the shape of a surface of another sealed structure (e.g. a second sealed structure such as a housing of a connector, a body, a plug, a cord, or an electric wire of a connector, or a fixture thereof) with which the lower surface of the first layer (1) may make contact.

The shape of the projecting portions that may be provided on the lower surface of the first layer (1) is not limited to any particular shape. It is preferable that the projecting portions that can be provided on the lower surface of the first layer (1) have triangular shapes or rectangular shapes (including trapezoids) such as quadrangles in cross-section. The projecting portions may have bilaterally symmetrical shapes or bilaterally asymmetrical shapes in cross-section. The projecting portions may have rounded apices.

The three projecting portions (114a, 114b, 114c) provided on the lower surface of the first layer (1) illustrated in A of FIG. 7 have triangular cross-sectional shapes raised downward.

In the illustrated embodiment, a perpendicular La passing through the apex of the upward projecting portion 111a and a perpendicular Ma passing through the apex of the downward projecting portion 114a are aligned with each other. Similarly, a perpendicular Lb passing through the apex of the upward projecting portion 111b and a perpendicular Mb passing through the apex of the downward projecting portion 114b are aligned with each other. A perpendicular Lc passing through the apex of the upward projecting portion 111c and a perpendicular Mc passing through the apex of the downward projecting portion 114c are aligned with each other.

The perpendiculars La, Lb, and Lc do not need to be aligned with the perpendiculars Ma, Mb, and Mc, respectively. In other words, the position of the apex of a projecting portion 111 on the upper side of the first layer (1) and the position of the apex of a projecting portion 114 on the lower side may be present in the same straight line as illustrated or may not be present in the same straight line.

As another variation, B of FIG. 7 illustrates a seal structure 120 having projecting portions 124, specifically two downward projecting portions (124a, 124b), on the lower surface of the first layer (1). For convenience of explanation, the downward projecting portion 124a is referred to as "first downward projecting portion", and the downward projecting portion 124b as "second downward projecting portion". They may be hereinafter sometimes abbreviated as "projecting portion 124a" and "projecting portion 124b."

First upward projecting portions 121 raised on the upper side of the first layer (1) of the seal structure 120, specifically three upward projecting portions (121a, 121b, 121c), may be formed in a manner which is similar to that in which the projecting portions (111a, 111b, 111c) illustrated in A of FIG. 7 are formed.

First upward projecting portions 122 of the second layer (2) of the seal structure 120, specifically three upward projecting portions (122a, 122b, 122c), may be formed in a manner which is similar to that in which the projecting portions (112a, 112b, 112c) illustrated in A of FIG. 7 are formed.

The two projecting portions (124a, 124b) provided on the lower surface of the first layer (1) illustrated in B of FIG. 7 have triangular cross-sectional shapes raised downward.

The shapes of the projecting portions (124a, 124b) are not limited to the shapes of triangles in cross-section, and may be triangular shapes or rectangular shapes (including trapezoids) such as quadrangles in cross-section. The shapes of the projecting portions (124a, 124b) may be bilaterally symmetrical shapes in cross-section as shown, for example, in A of FIG. 7. Further, the projecting portions (124a, 124b) may have rounded apices.

In the illustrated embodiment, a perpendicular Ma passing through the apex of the downward projecting portion 124a is not aligned with a perpendicular La passing through the apex of the upward projecting portion 121a. Further, similarly, a perpendicular Mb passing through the apex of the downward projecting portion 124b is not aligned with a perpendicular Lb passing through the apex of the upward projecting portion 121b.

The formation of such projecting portions allows the downward projecting portions (124a, 124b) and the upward projecting portions (121a, 121b, 121c) of the first layer (1) to be alternately arranged. Such a configuration makes it possible to further reduce the overall thickness of the first layer (1). Moreover, the size of the seal structure 120 can be further reduced in a thickness direction.

In the seal structure of the present disclosure, the downward projecting portions of the first layer (1) may have shapes which are similar to those of the upward projecting portions shown, for example, in any of FIGS. 2 to 6.

The seal structure of the present disclosure may further include a given "third layer" as needed. Specifically, the seal structure of the present disclosure may further include a third layer on a lower surface of the first layer (i.e. a surface of the first layer opposite to the surface of the first layer on which the second layer is provided). In other words, in the seal structure of the present disclosure, the first layer may be located between the third layer and the second layer. The following describes the third layer in detail.

[Third Layer]

The third layer has a laminar structure, and has at least one "first downward projecting portion".

The "first downward projecting portion" that may be included in the third layer means a portion raised downward from a surface of the third layer (and is hereinafter sometimes abbreviated as "downward projecting portion" or simply as "projecting portion"). The number of projecting portions that may be provided in the third layer is not limited to any particular number. For example, one to ten projecting portions may be provided in the third layer. Preferably, one to five projecting portions may be provided in the third layer. More preferably, one to three projecting portions may be provided in the third layer. The projecting portion may for example be a projection raised from the surface of the third layer to continuously extend.

In the present disclosure, the word "downward" of the "first downward projecting portion" of the "third layer" means a direction opposite to the "second layer".

The shape of the downward projecting portion that may be provided in the third layer is not limited to any particular shape. It is preferable that the outer shape of the projecting portion be a triangular shape or a rectangular shape (including a trapezoid) such as a quadrangle in cross-section. The downward projecting portion may have a rounded edge portion. Alternatively, the downward projecting portion may have a circular arc apex. It is preferable that the apex of the downward projecting portion of the third layer be more rounded than the apex of the downward projecting portion that may be provided on the lower surface of the first layer.

Figure 8:
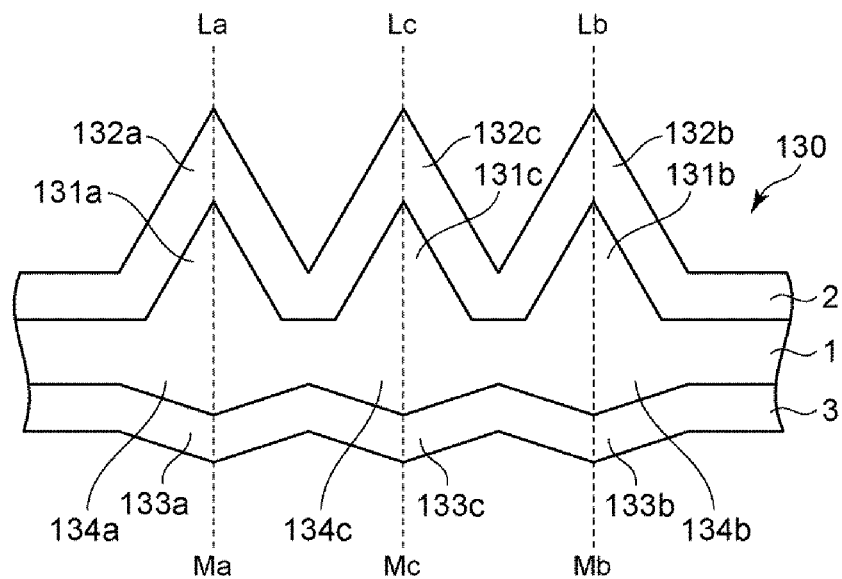
FIG. 8 is a schematic view schematically showing a seal structure according to another embodiment of the present disclosure.
Figure 8:
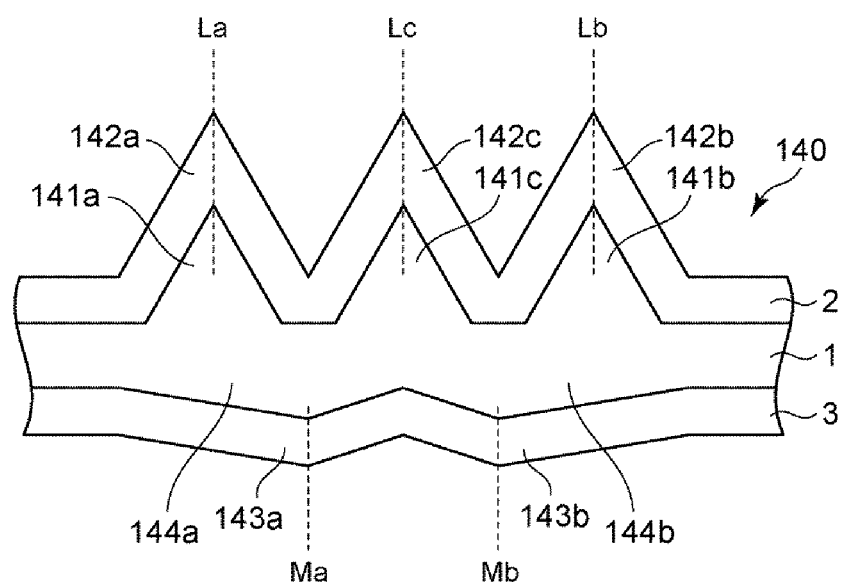
Figure 9:
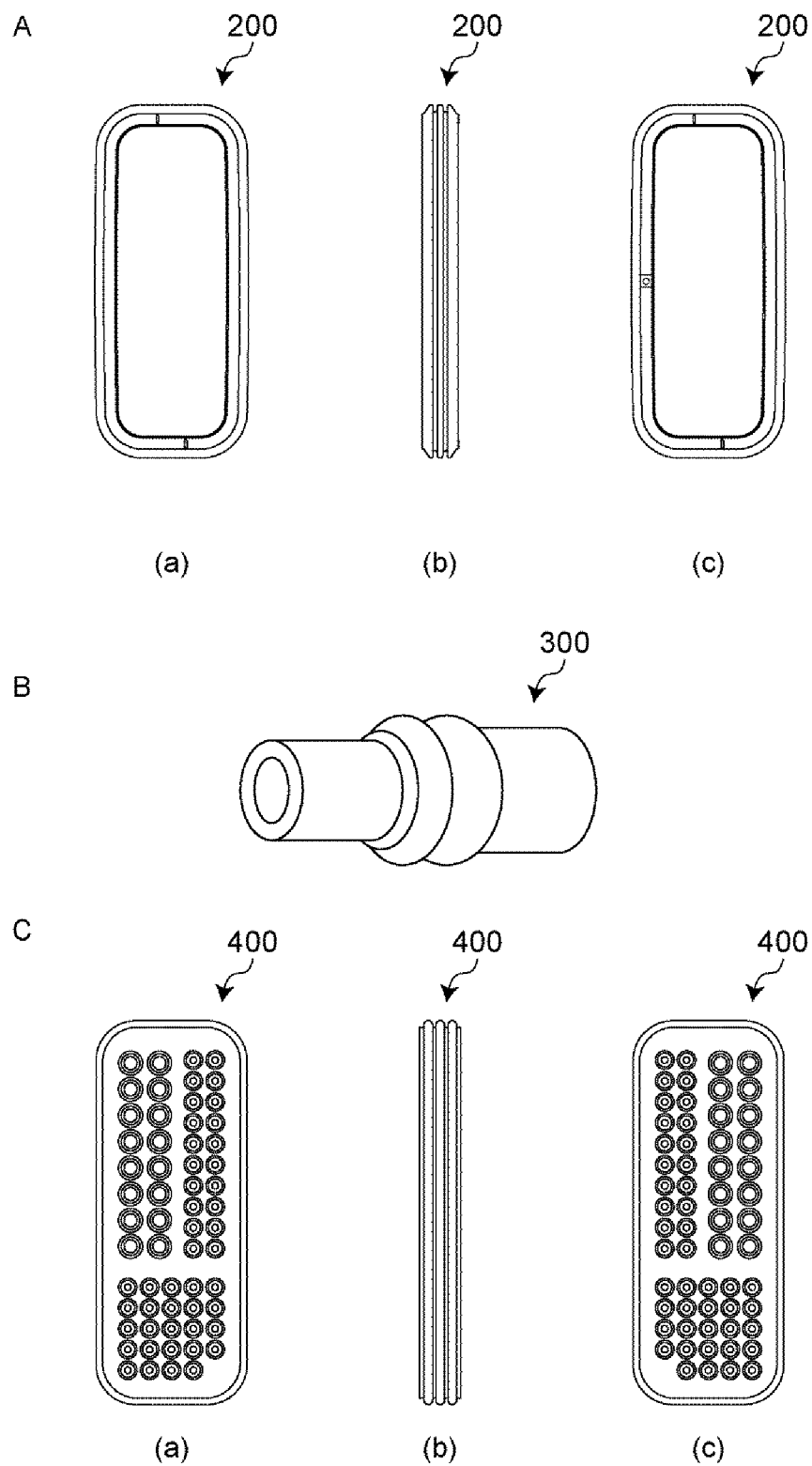
FIG. 9 is a schematic view schematically showing a variation of the overall shape of a seal structure of the present disclosure.

The downward projecting portion that may be provided in the third layer may extend, for example, so as to meander in a cross-sectional view of the seal structure (see FIG. 8).

It is preferable that the composition material that may constitute the third layer (hereinafter sometimes referred to as "composition material of the third layer") be softer than the composition material of the first layer. In other words, it is preferable that the composition material of the first layer be harder than the composition material of the third layer. Further, the composition material of the third layer has such flexibility as to more easily deform than the composition material of the first layer in response to external force. That is, the composition material of the first layer has such flexibility as to more hardly deform than the composition material of the third layer.

It is preferable that the composition material of the third layer contain resin. Any resin can be used in the third layer, and for example, it is preferable that rubber such as polybutadiene or silicone be used. Further, resin that can be used in the third layer may be selected depending on temperature.

In the present disclosure, resin primarily contained in the composition material of the third layer is referred to as "third resin".

The hardness of the composition material of the third layer is lower than the hardness of the composition material of the first layer, and is not limited to any particular range.

Examples of the hardness of the composition material of the third layer include Shore hardness, Rockwell hardness, Vickers hardness, Brinell hardness, durometer hardness, and Barcol hardness. The hardness of the composition material of the third layer is not limited to any particular value, and any of the above hardnesses falls within a range of for example 20 to 50, preferably 25 to 45, or more preferably 30 to 40. It is preferable that Shore hardness or durometer hardness fall within the above range. In a case where the composition material of the third layer is for example resin, the hardness of the composition material of the third layer can be changed by a filler, a hardening agent, or other substances that are used in manufacturing the resin.

The third layer may further include, on an as-needed basis, at least one "second downward projecting portion" or "third downward projecting portion" or other portions that are different in shape from the "first downward projecting portion" of the third layer.

In the seal structure of the present disclosure, it is preferable that as shown, for example, in FIG. 8, the first layer have at least one first downward projecting portion on a side thereof facing the third layer. Furthermore, it is preferable that the third layer have at least one first downward projecting portion, too. It is preferable that at least part of the first downward projecting portion of the first layer be covered with the first downward projecting portion of the third layer. It is preferable that a composition material of the first layer be harder than a composition material of the third layer. In other words, it is preferable that the composition material of the third layer be softer than the composition material of the first layer.

Such a configuration makes it possible to form a more appropriate seal with a sealed structure (or a second sealed structure) that makes contact with the third layer.

The whole of a surface of the first downward projecting portion of the first layer may be covered with the first downward projecting portion of the third layer. Alternatively, only part of the surface of the first downward projecting portion of the first layer may be covered with the first downward projecting portion of the third layer. It is preferable that the apex of the first downward projecting portion of the first layer be covered with the first downward projecting portion of the third layer.

In the seal structure of the present disclosure, it is preferable that the composition material of the first layer contain resin (e.g. a first resin), and the composition material of the third layer contain resin (e.g. a third resin), too. It is preferable that the third resin be softer than the first resin. In other words, it is preferable that the first resin be harder than the third resin.

Such a configuration allows the third layer and the sealed structure (or the second sealed structure) to make contact with each other more appropriately, making it possible to bring about further improvement in sealability.

In the present disclosure, any resin is used, provided a difference in hardness can be provided between the third resin and the first resin. In the third resin and the first resin, identical types of resin differing in hardness from each other may be used. Alternatively, in the third layer and the first layer, different types of resin differing in hardness from each other may be used.

More specifically, in the case of any of the above hardnesses, the difference between the hardness of the material that may constitute the third layer, specifically the third resin, and the hardness of the material that may constitute the first layer, specifically the first resin, fall within a range of preferably 5 to 25 or more preferably 10 to 20. By thus providing a difference in hardness between the third layer and the first layer in the seal structure of the present disclosure, further improvement in sealability can be brought about.

For example, A of FIG. 8 shows a seal structure 130 having a third layer (3). The seal structure 130 can be formed by disposing the third layer (3) on the lower surface of the first layer (1) of the seal structure 110 illustrated in A of FIG. 7 already mentioned (i.e. the surface of the first layer (1) facing away from the second layer (2)).

In the seal structure 130 shown in A of FIG. 8, downward projecting portions 133 (specifically first downward projecting portions 133a, 133b, 133c) of the third layer (3) are disposed on surfaces of downward projecting portions 134 (specifically first downward projecting portions 134a, 134b, 134c) provided in the first layer (1). Although, in the illustrated embodiment, the positions of the apices of the downward projecting portions 134 of the first layer (1) and the positions of the apices of the downward projecting portions 133 of the third layer (3) are aligned with each other on perpendiculars Ma, Mb, and Mc, respectively, they may not be aligned with each other.

As another variation, for example, B of FIG. 8 shows a seal structure 140 having a third layer (3). The seal structure 140 can be formed by disposing the third layer (3) on the lower surface of the first layer (1) of the seal structure 120 illustrated in B of FIG. 7 already mentioned (i.e. the surface of the first layer (1) facing away from the second layer (2)).

In the seal structure 140 shown in B of FIG. 8, downward projecting portions 143 (specifically a first downward projecting portion 143a and a second downward projecting portion 143b) of the third layer (3) are disposed on surfaces of downward projecting portions 144 (specifically a first downward projecting portion 144a and a second downward projecting portion 144b) provided in the first layer (1). Although, in the illustrated embodiment, the positions of the apices of the downward projecting portions 144 of the first layer (1) and the positions of the apices of the downward projecting portions 143 of the third layer (3) are aligned with each other on perpendiculars Ma and Mb, respectively, they may not be aligned with each other.

In the seal structure of the present disclosure, the downward projecting portions of the third layer (3) may have shapes which are similar to those of the upward projecting portions of the second layer (2) shown, for example, in any of FIGS. 2 to 6.

(Overall Shape)

For example, FIG. 9 shows the overall shapes of seal structures of the present disclosure. Examples include (A) a ring-type seal structure 200, (B) a tube-type seal structure 300, (C) a porous seal structure 400, or other seal structures. Specifically, A of FIG. 9 shows (a) the front, (b) the side, and (c) the rear of the ring-type seal structure 200. Projecting portions of the seal structure 200 can be seen on the side (b) of A of FIG. 9. B of FIG. 9 is an isometric view showing the overall shape of the tube-type seal structure 300. C of FIG. 9 shows (a) the front, (b) the side, and (c) the rear of the porous seal structure 400. Projecting portions of the seal structure 400 can be seen on the side (b) of C of FIG. 9.

Figure 10:
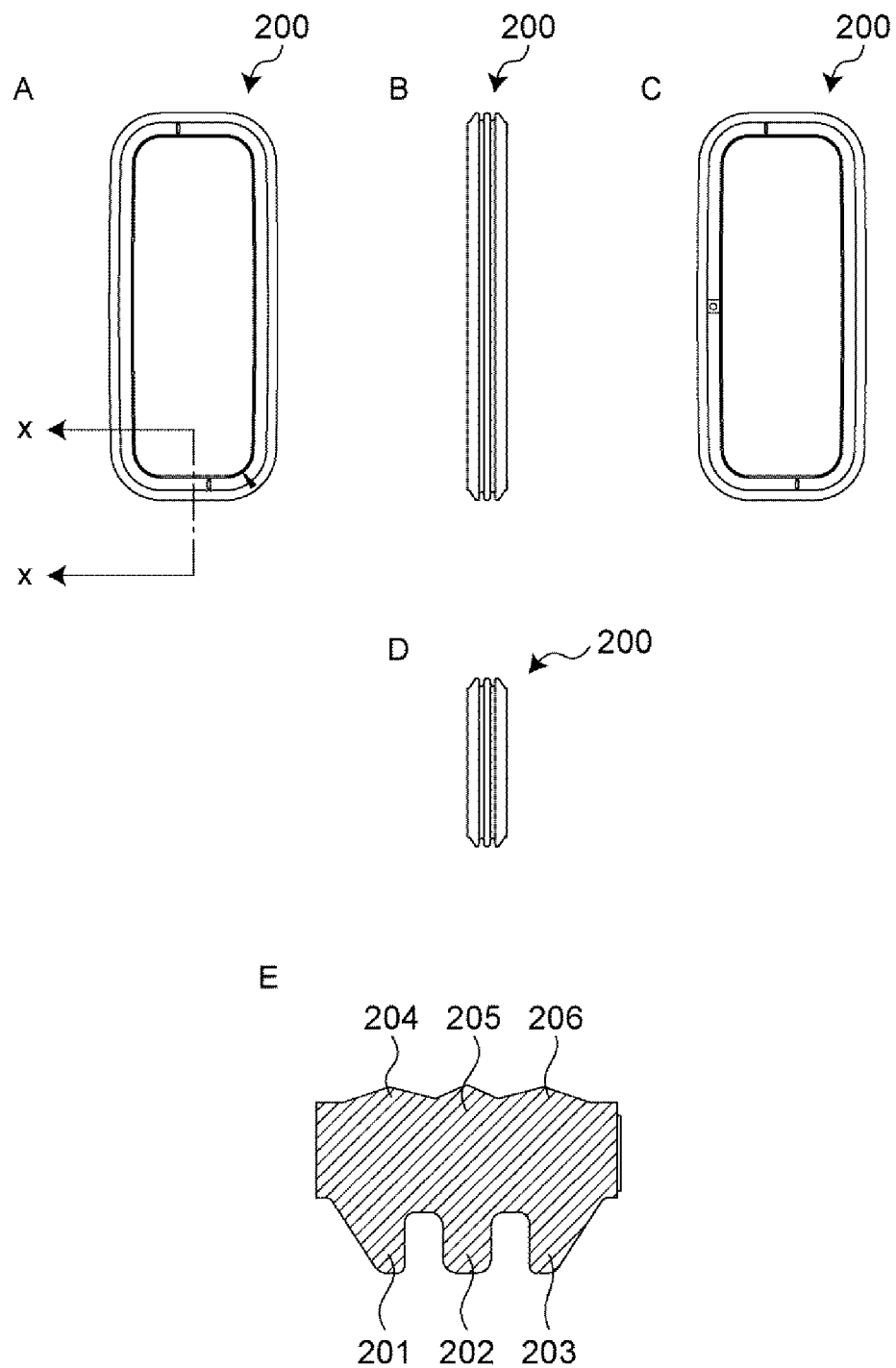
FIG. 10 is a schematic view schematically showing an example of a ring-type seal structure.

The following briefly describes the ring-type seal structure 200, the tube-type seal structure 300, and the porous seal structure 400. FIG. 10 shows the ring-type seal structure 200 ((A) front, (B) side, (C) rear, (D) bottom or top). The ring-type seal structure 200 has an annular overall structure. The seal structure 200 has three projections (201, 202, 203) provided as projecting portions on the outer periphery thereof and three projections (204, 205, 206) provided as projecting portions on the inner periphery (see E of FIG. 10).

The seal structure 200 can form a seal, for example, by being placed between a housing of a connector (or a first sealed structure) and a connector body (or a second sealed structure) that can mate with the housing of the connector. It is preferable that the seal structure 200 be fitted to the connector body or the like first then inserted into the connector housing.

E of FIG. 10 schematically shows a simplified cross-section of the seal structure 200 as taken along line x-x in A of FIG. 10. The projecting portions 201, 202, and 203 schematically show projecting portions that may be provided in the "second layer" of the present disclosure. The projecting portions 204, 205, and 206 schematically show the projecting portions that may be provided in the "first layer" or "third layer" of the present disclosure. For simplification of explanation, the cross-section of E of FIG. 10 does not show a boundary between the first layer, the second layer, and/or the third layer.

Figure 11:
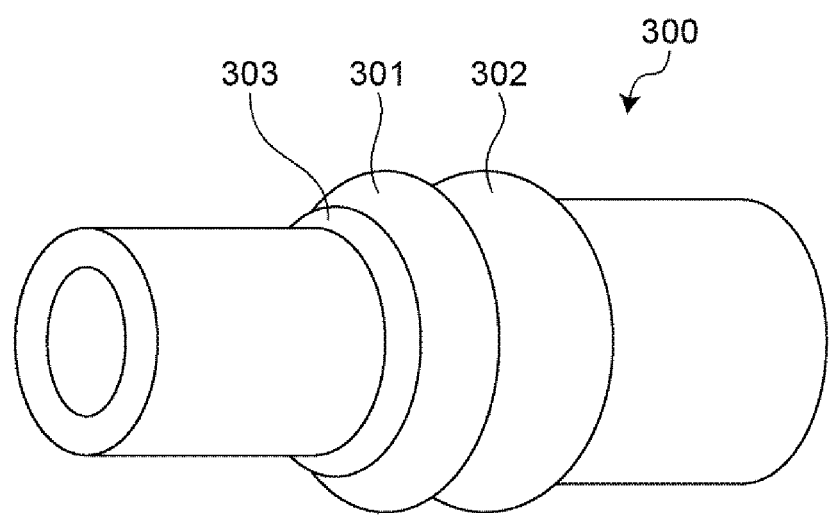
FIG. 11 is a schematic view schematically showing an example of a tube-type seal structure.

FIG. 11 is an isometric view schematically showing the tube-type seal structure 300. The tube-type seal structure 300 has a tubular overall structure, and has two projections (301, 302) as projecting portions on the outer periphery thereof. The projecting portions 301 and 302 correspond to the projecting portions that may be provided in the "second layer" of the present disclosure. In the illustrated embodiment, a projecting portion 303 corresponds to the projecting portion of the "first layer" of the present disclosure. In the illustrated embodiment, the projecting portion 301 is formed on the upper side of the projecting portion 303.

Preferably, the tube-type seal structure 300 is configured such that a sealed structure (or a second sealed structure) such as a cord, an electric wire, or a fixture thereof can be fixedly placed in a through-hole provided inside the tube-type seal structure 300. It is preferable that the inside shape of the through-hole (i.e. the shape of a surface of the "first layer" or "third layer" of the present disclosure opposite to the "second layer" (see FIGS. 7 and 8)) be complementary to the shape of a surface of a sealed structure (or a second sealed structure) that may be placed in the through-hole. The tube-type seal structure 300 allows a seal to be formed by placing a sealed structure (or a second sealed structure) such as a cord, an electric wire, or a fixture thereof into the through-hole and, furthermore, inserting the tube-type seal structure 300 into a sealed structure (or a first sealed structure) such as a hosing of a connector.

Figure 12:
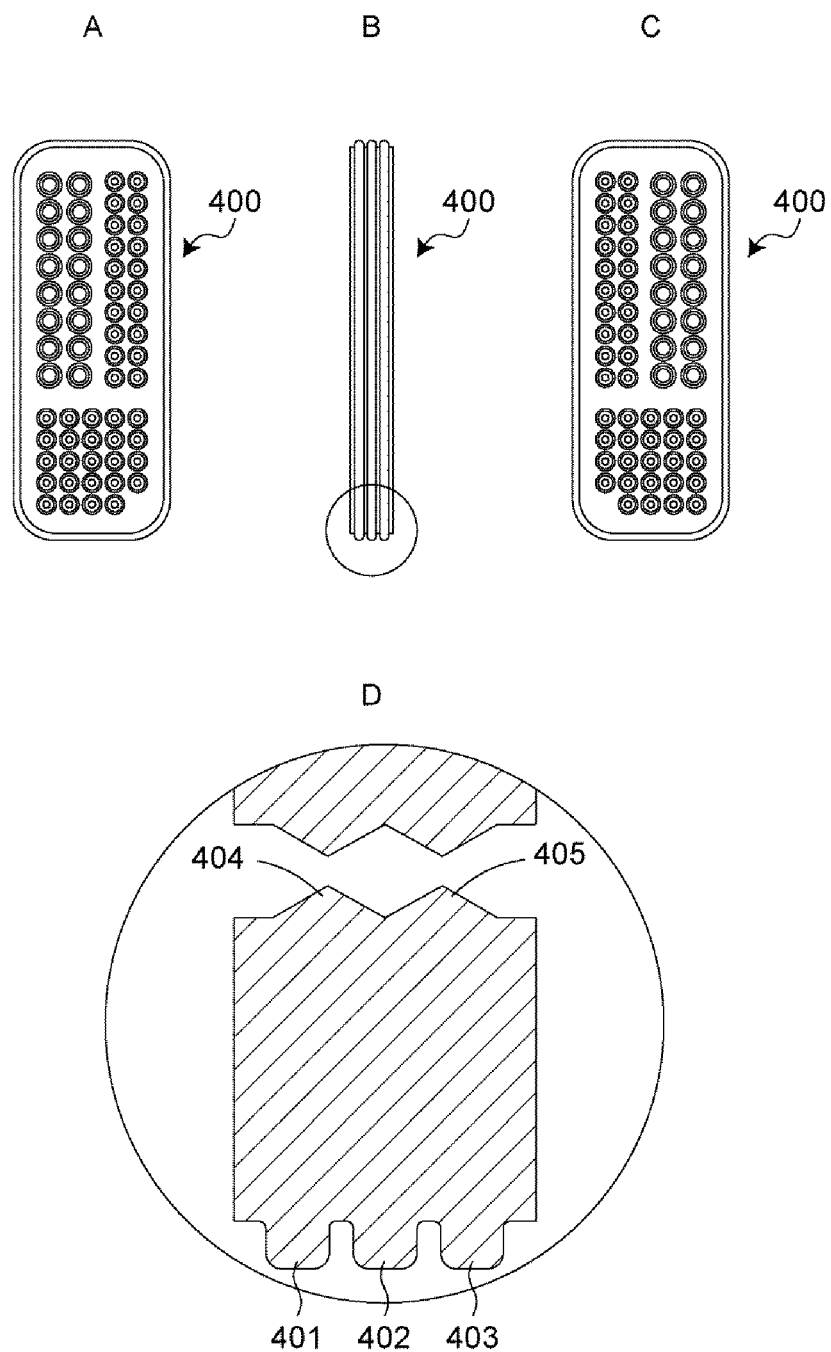
FIG. 12 is a schematic view schematically showing an example of a porous seal structure.
Figure 13:
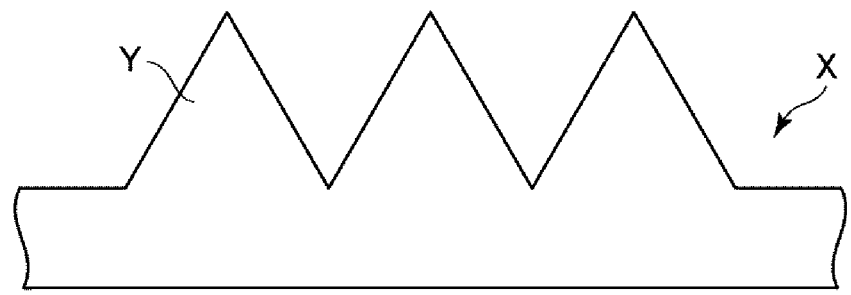
FIG. 13 is a schematic view schematically showing a conventional seal structure.
Figure 13:
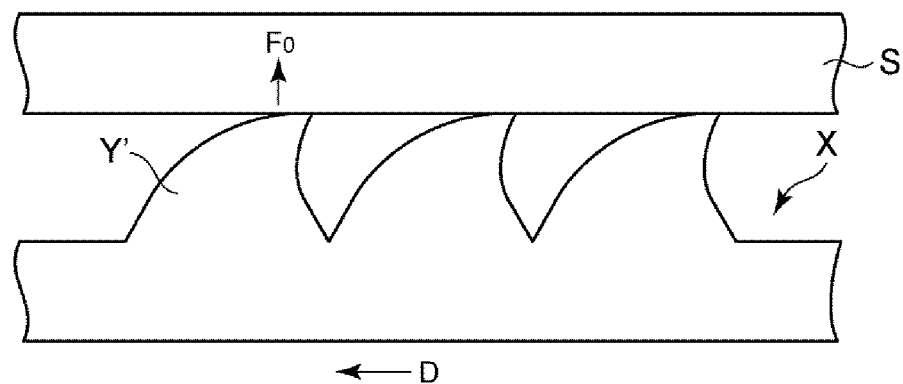
Figure 13:
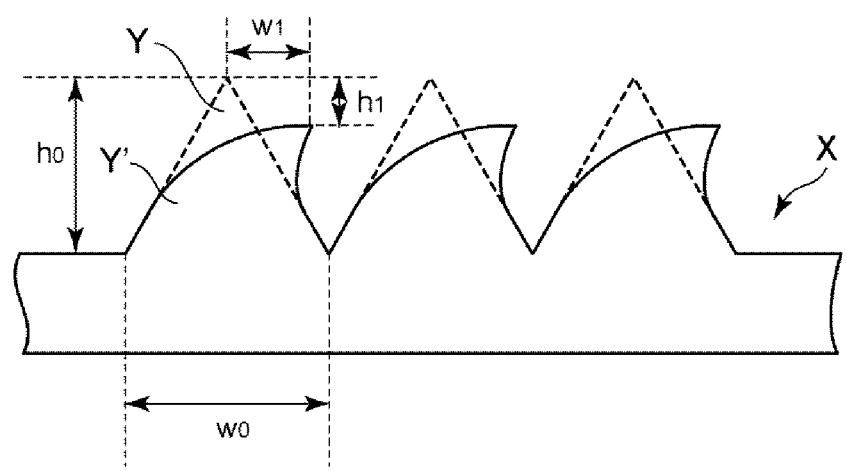

FIG. 12 shows the porous seal structure 400 ((A) front, (B) side, (C) rear, (D) partial cross-section). The porous seal structure 400 is for example in the shape of a plate, has a plurality of through-holes, and has three projections (401, 402, 403) provided as projecting portions on the outer periphery and two projections (404, 405) provided as projecting portions inside the through-holes (see D of FIG. 12).

The porous seal structure 400 allows a seal to be formed by placing a sealed structure (or a second sealed structure) such as a cord, an electric wire, or a fixture thereof into the plurality of through-holes and, furthermore, inserting the porous seal structure 400 into a sealed structure (or a first sealed structure) such as a hosing of a connector.

D of FIG. 12 schematically shows a simplified cross-section of an encircled portion of the seal structure 400 shown in B of FIG. 12. The projecting portions 401, 402, and 403 schematically show projecting portions that may be provided in the "second layer" of the present disclosure. The projecting portions 404 and 405 schematically show projecting portions that may be provided in the "first layer" or "third layer" of the present disclosure (however, projecting portions opposite to the "second layer" of the present disclosure). For simplification of explanation, the partial cross-section of D of FIG. 12 does not show a boundary between the first layer, the second layer, and/or the third layer.

A seal structure of the present disclosure is not limited to the above embodiments. In the present disclosure, the foregoing embodiments may be appropriately combined as needed for use. In particular, the shapes of projecting portions may be appropriately combined as needed for use.

[Method for Manufacturing Seal Structure of the Present Disclosure]

A seal structure of the present disclosure can be manufactured by primarily utilizing "two-color molding". For example, the first layer and the second layer and, when needed, the third layer can be formed by "two-color molding". Further, the projecting portions can be each independently formed by "two-color molding". It is preferable that the seal structure of the present disclosure be a laminated body. It is more preferable that the seal structure of the present disclosure be a laminated body integrally manufactured by two-color molding.

A seal structure of the present disclosure is applicable, for example, to various fields that require properties such as a waterproofing property, a dustproofing property, and/or airtightness. The seal structure of the present disclosure can be used especially in a connector for use in an electrical connection, particularly a housing of a connector.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A seal structure configured for use with a housing structure of an electrical connector for shielding an unpressurized space between the seal structure and the housing structure from contamination from an external environment of approximately ambient atmospheric pressure, the seal structure having a compressible resin seal comprising: a solid first layer composed of a first resin including a first resin material, wherein the first resin material has a Shore durometer of less than 50, the first solid layer having a lower surface and an upper surface, wherein the lower surface is in sealing contact with a surface of the electrical connector, and at least one first upward projecting portion extending from the upper surface; and a solid second layer composed of a second resin including a second resin material, the second solid layer having an upper surface and a lower surface congruent with the upper surface of the first layer and continuously overlying at least part of the first upward projecting portion with a substantially constant thickness, and at least one first upward projecting portion extending from the second upper surface, wherein first resin material of the first layer is harder than a second resin material of the second layer, wherein the first upward projecting portion of the first layer deforms under compression substantially less than the upward projecting portion of the second layer upon placement of the seal into a sealed structure, whereby the seal structure prevents the entry of gas, moisture and/or dust into the space between the seal structure and the sealed structure.

2. The seal structure according to claim 1, wherein the first upward projecting portion of the second layer is flexible.

3. A compressible resin seal configured for use with a housing structure of an electrical connector for shielding an unpressurized space between the compressible resin seal and the housing structure from contamination from an external environment of approximately ambient atmospheric pressure, the compressible resin seal comprising at least:
a first layer having a lower surface in sealing contact with a surface of the electrical connector at least one first upward projecting portion; and
a second layer of a substantially constant thickness that is thinner than and in continuous contact with the first layer and having at least one first upward projecting portion,
wherein at least part of an upper surface of the first upward projecting portion of the first layer is covered by and congruent with a lower surface of the first upward projecting portion of the second layer, and a resin of the first layer is harder than a resin of the second layer, wherein a height of the first upward projecting portion of the second layer varies within a range of less than 50% with respect to an overall height of the projecting portion,
wherein the first resin material of the first layer has a Shore durometer of less than 50, and wherein the first resin is harder than the second resin.

4. The seal structure according to claim 1, wherein the first layer includes at least one second upward projecting portion, the second layer includes at least one second upward projecting portion, and at least part of the second upward projecting portion of the first layer is covered with the second upward projecting portion of the second layer.

5. The seal structure according to claim 4, wherein the first layer includes at least one third upward projecting portion, the second layer includes at least one third upward projecting portion, and at least part of the third upward projecting portion of the first layer is covered with the third upward projecting portion of the second layer.

6. The seal structure according to claim 5, wherein a resin of the first upward projecting portion of the first layer is different in hardness from at least one of a resin of the second upward projecting portion or a resin of the third upward projecting portion of the first layer, or a resin of the first upward projecting portion of the second layer is different in hardness from a resin of at least one of the second upward projecting portion or the third upward projecting portion of the second layer.

7. The seal structure according to claim 1, further comprising a third layer, wherein the first layer is located between the third layer and the second layer.

8. The seal structure according to claim 7, wherein the first layer has at least one first downward projecting portion on a side thereof facing the third layer, the third layer has at least one first downward projecting portion, at least part of the first downward projecting portion of the first layer is covered with the first downward projecting portion of the third layer, and the first resin of the first layer is harder than a third resin of the third layer.

9. The seal structure according to claim 8, wherein the first resin of the first layer contains the first resin material, the third resin of the third layer contains a third resin, and the first resin is harder than the third resin.

10. The seal structure according to claim 8, wherein the at least one first downwardly projecting portion is aligned vertically with at least one first upwardly projecting portions of the first and second layers.

11. The seal structure according to claim 8, wherein the at least one first downwardly projecting portion is offset in a horizontal direction from the at least one first upwardly projecting portions of the first and second layers.

12. The seal structure according to claim 1, wherein the first layer has at least one first downwardly projecting portion on a side thereof opposite the second layer.

13. The seal structure according to claim 12, wherein the at least one first downwardly projecting portion is aligned vertically with at least one first upwardly projecting portion of the first and second layers.

14. The seal structure according to claim 12, wherein the at least one first downwardly projecting portion is offset in a horizontal direction from the at least one first upwardly projecting portion of the first and second layers.

15. The seal structure according to claim 1, wherein the seal structure is a laminated body.

16. The seal structure according to claim 1, wherein the seal structure defines an annular shape.

17. The seal structure according to claim 1, wherein the upward projecting portions of at least one of the first or second layers comprises rounded edge portions.

18. The seal structure according to claim 12, wherein the upward projecting portions of at least one of the first or second layers include apexes defining circular arcs.

19. The seal structure according to claim 1, wherein first upward projecting portion of the second layer has a cross-section in the form of a right-triangle.

* * * * *